(12) United States Patent
Liu et al.

(10) Patent No.: US 8,981,931 B2
(45) Date of Patent: Mar. 17, 2015

(54) EARTHQUAKE ALARMING DEVICE WITH RESCUE ASSISTING CAPABILITY

(71) Applicant: Che-Wei Liu, New Taipei (TW)

(72) Inventors: Che-Wei Liu, New Taipei (TW); Hsin-Tai Hsiao, Taipei (TW); Zhao-Yu Liu, New Taipei (TW)

(73) Assignees: Che-Wei Liu, New Taipei (TW); Che-Ming Liu, New Taipei (TW)

( * ) Notice: Subject to any disclaimer, the term of this patent is extended or adjusted under 35 U.S.C. 154(b) by 168 days.

(21) Appl. No.: 13/895,870

(22) Filed: May 16, 2013

(65) Prior Publication Data

US 2013/0314230 A1 Nov. 28, 2013

(30) Foreign Application Priority Data

May 21, 2012 (TW) .............................. 101209559 U

(51) Int. Cl.
 *G08B 1/08* (2006.01)
 *G08B 21/10* (2006.01)
 *G08B 13/16* (2006.01)
 *G01V 1/00* (2006.01)

(52) U.S. Cl.
 CPC ............ *G08B 21/10* (2013.01); *G08B 13/1663* (2013.01); *G01V 1/008* (2013.01)
 USPC ..................................... 340/539.26; 340/690

(58) Field of Classification Search
 CPC .... G08B 13/1663; G08B 21/10; G01V 1/008; H01H 35/144
 USPC ..................... 340/539.26, 689, 690
 See application file for complete search history.

(56) References Cited

U.S. PATENT DOCUMENTS

| | | | | |
|---|---|---|---|---|
| 4,297,690 | A * | 10/1981 | Baker | 340/690 |
| 4,662,225 | A * | 5/1987 | Koh et al. | 340/601 |
| 4,764,762 | A * | 8/1988 | Almour | 340/690 |
| 5,418,523 | A * | 5/1995 | Anderson et al. | 340/690 |
| 5,539,387 | A * | 7/1996 | Gitlis et al. | 340/690 |
| 5,726,637 | A * | 3/1998 | Miyahara et al. | 340/690 |
| 8,259,969 | B2 * | 9/2012 | Xi | 381/165 |
| 2013/0241727 | A1* | 9/2013 | Coulombe | 340/517 |
| 2014/0266762 | A1* | 9/2014 | Warren et al. | 340/690 |

* cited by examiner

*Primary Examiner* — John A Tweel, Jr.
(74) *Attorney, Agent, or Firm* — Hunton & Williams LLP

(57) ABSTRACT

An earthquake alarming device with rescue assisting capability includes a casing and a circuit unit. The circuit unit is disposed in the casing and includes a control module, and a seismic sensory module, a speaker, a transmitter module and a heating module all connected to the control module. The seismic sensory is capable of detecting an earthquake. The control module controls the speaker to generate an audio alarm, controls the transmitter module to transmit a wireless signal, and controls the heating module to generate heat when informed by the seismic sensory module that an earthquake has been detected.

7 Claims, 7 Drawing Sheets

EARTHQUAKE ALARMING DEVICE WITH RESCUE ASSISTING CAPABILITY

CROSS-REFERENCE TO RELATED APPLICATION

This application claims priority of Taiwanese Patent Application No. 101209559, filed on May 21, 2012.

BACKGROUND OF THE INVENTION

1. Field of the Invention

This invention relates to an earthquake alarming device, more particularly to an earthquake alarming device with rescue assisting capability.

2. Description of the Related Art

A conventional earthquake warning system includes a seismic sensory module, a rechargeable battery, a speaker, an indicator lamp unit, and a control module that is electrically connected to the seismic sensory module, the rechargeable battery, the speaker and the indicator lamp unit.

After detecting an earthquake, the seismic sensory module informs the control module of the same so that the control module controls the speaker to generate an audio alarm, and controls the indicator lamp unit to indicate an "Earthquake Alarm" status.

The conventional earthquake warning system is further equipped with a radio module, which can be switched on manually to generate an acoustic SOS signal (i.e., a Morse code distress signal).

However, the conventional earthquake warning system is inadequate in terms of rescue and safety measures.

SUMMARY OF THE INVENTION

Therefore, an object of the present invention is to provide an earthquake alarming device with enhanced rescue assisting capability.

Accordingly, an earthquake alarming device of this invention includes a casing and a circuit unit. The circuit unit is disposed in the casing and includes a control module, a seismic sensory module, a speaker, a transmitter module and a heating module.

The seismic sensory module is electrically connected to the control module and is capable of detecting an earthquake.

The speaker is electrically connected to the control module and is capable of generating an audio alarm.

The transmitter module is electrically connected to the control module and is capable of transmitting a wireless signal.

The heating module is electrically connected to the control module and is capable of generating heat.

The control module controls the heating module to generate the heat, controls the speaker to generate the audio alarm and controls the transmitter module to transmit the wireless signal upon being informed by the seismic sensory module that an earthquake is detected.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
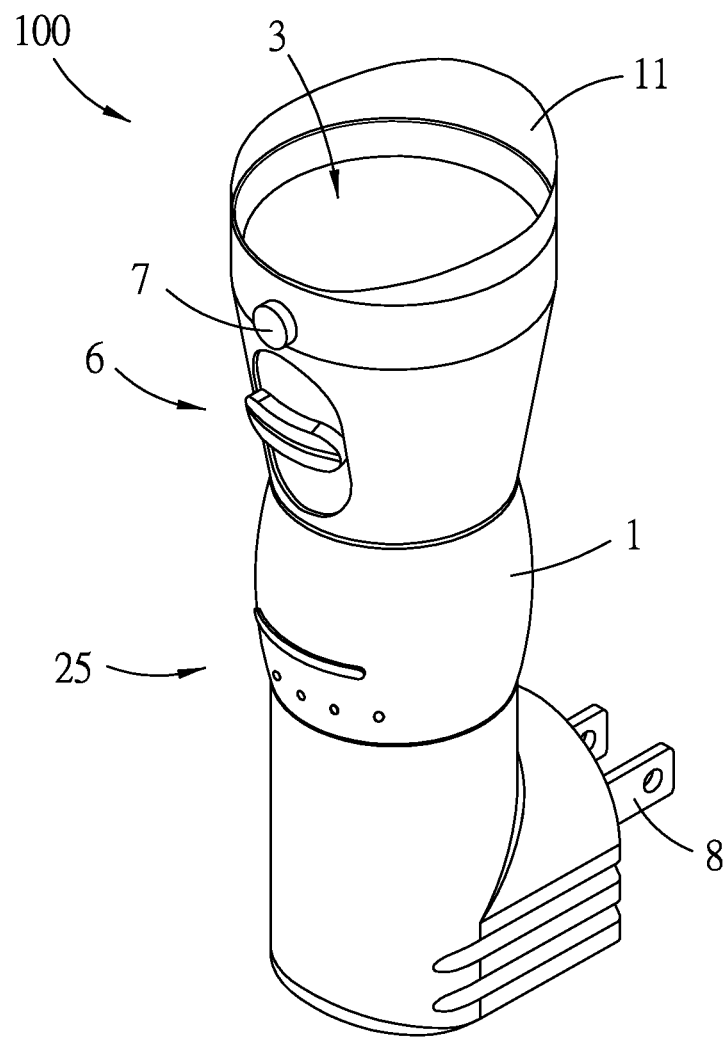
FIG. 1 is a perspective view of an earthquake alarming device according to the first preferred embodiment of this invention.

Before the present invention is described in greater detail with reference to the accompanying preferred embodiments, it should be noted herein that like elements are denoted by the same reference numerals throughout the disclosure.

Figure 2:
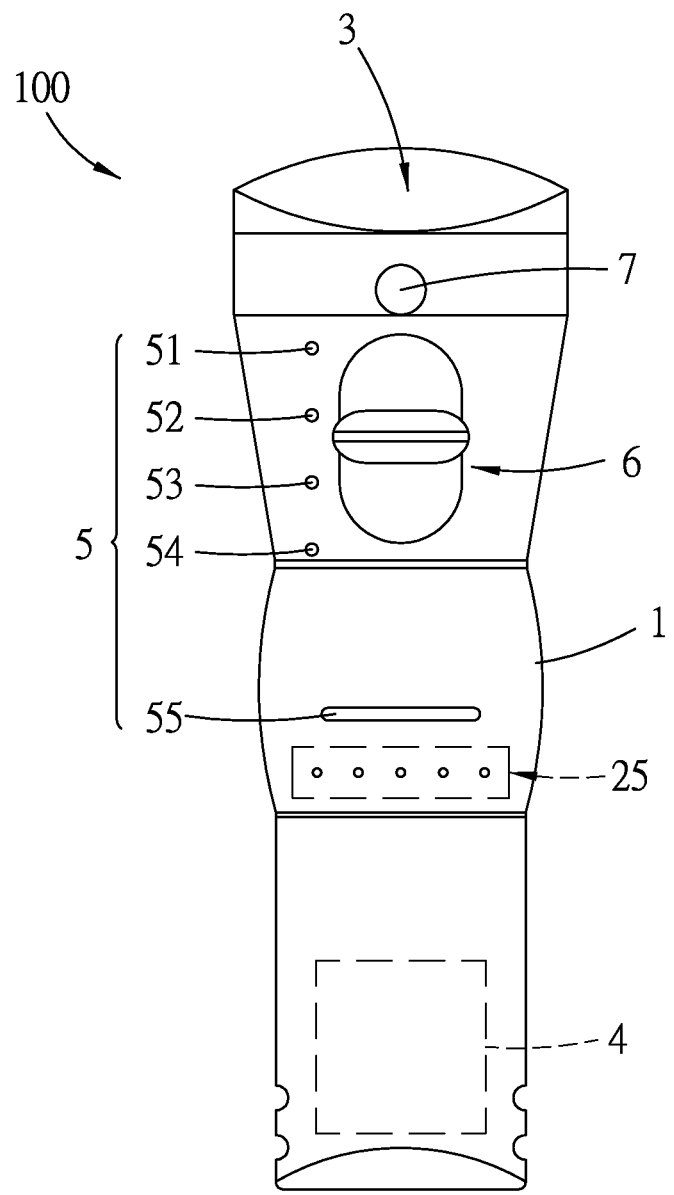
FIG. 2 is a front schematic view of the first preferred embodiment.
Figure 3:
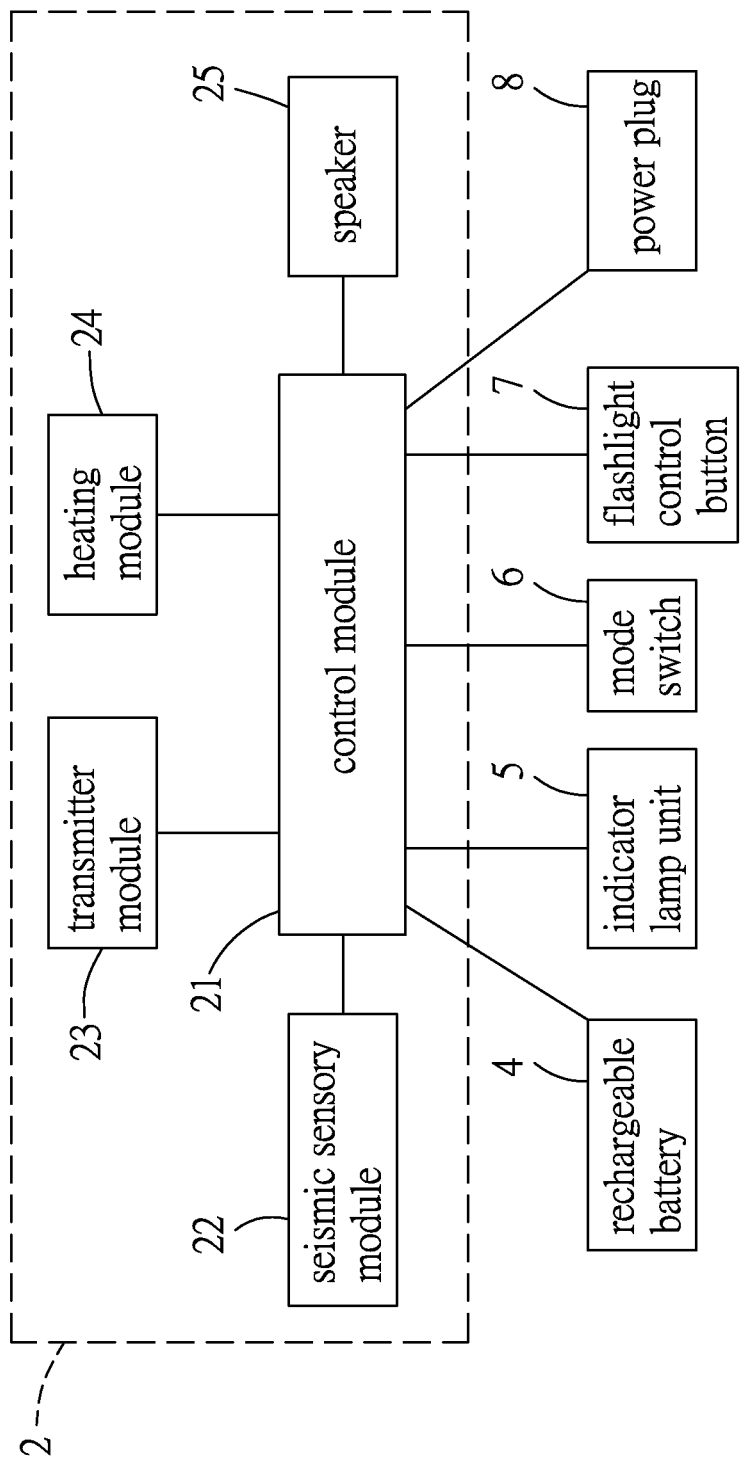
FIG. 3 is a fragmentary block diagram of the first preferred embodiment.
Figure 4A:
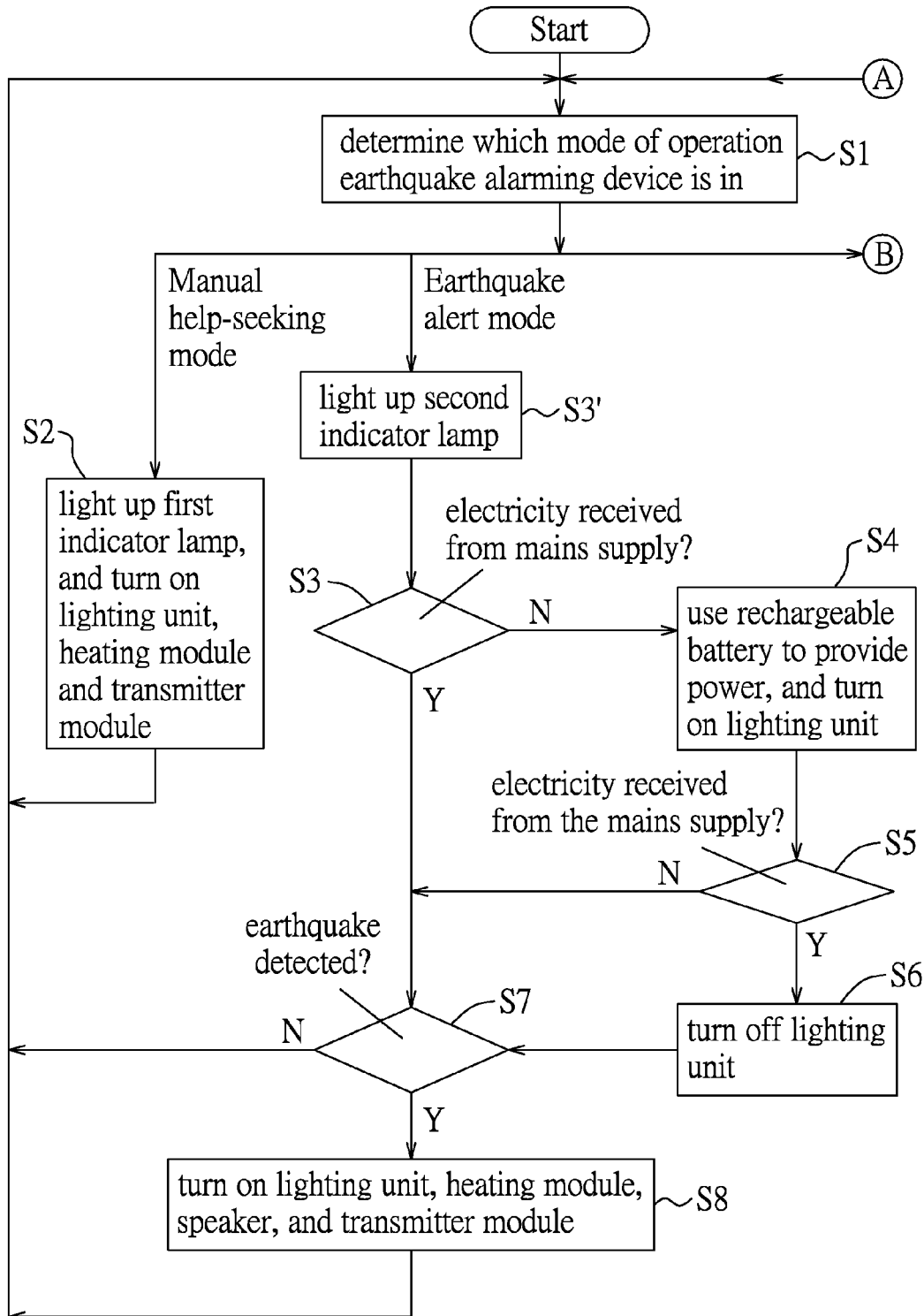
FIGS. 4A and 4B cooperatively constitue a flow chart for illustrating operation of the first preferred embodiment.
Figure 4B:
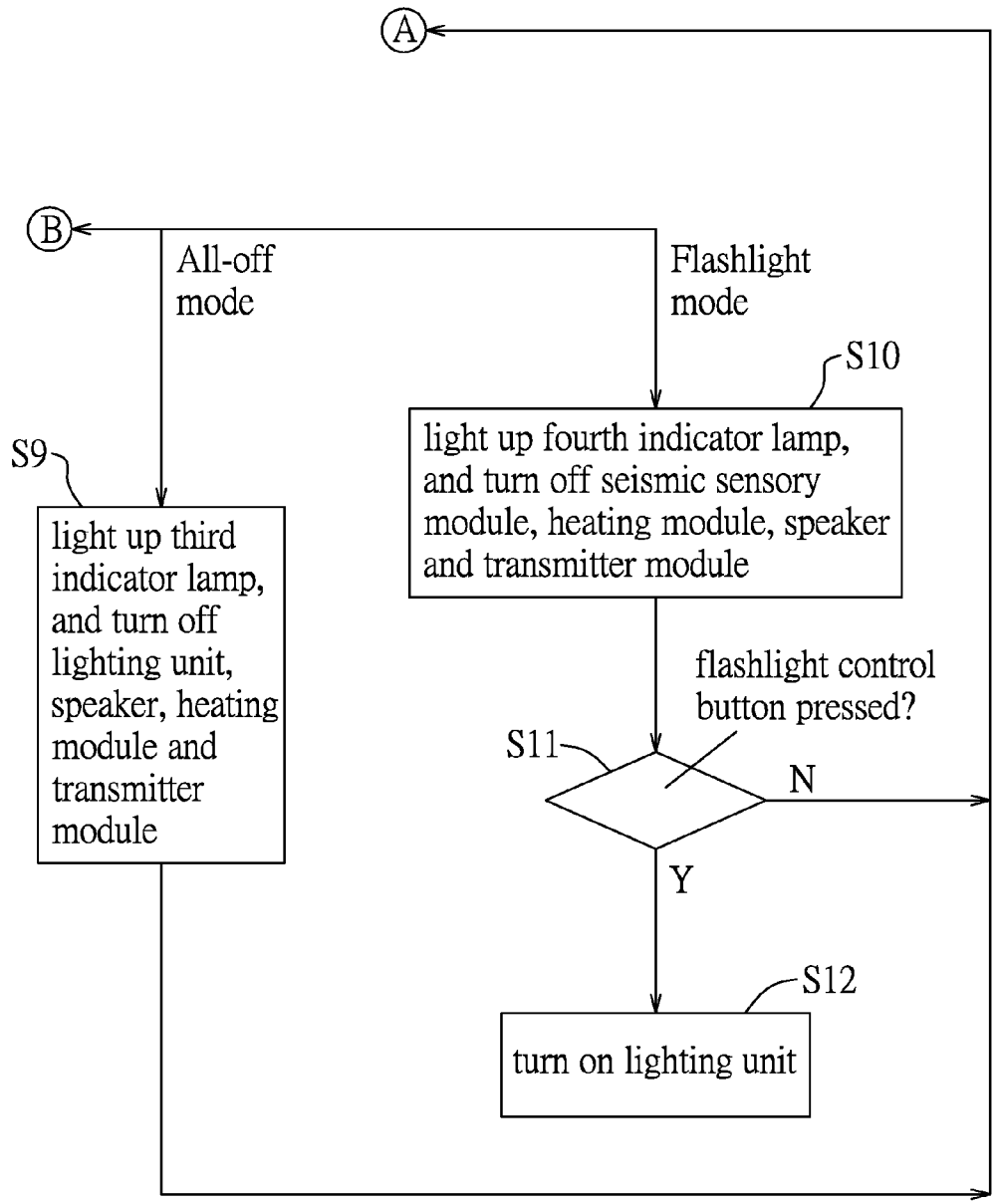

Referring to FIGS. 1 to 3, an earthquake alarming device with rescue assisting capability 100 (also referred to hereinafter as the earthquake alarming device 100) according to the first preferred embodiment of this invention includes a casing 1, a circuit unit 2, a lighting unit 3, a rechargeable battery 4, an indicator lamp unit 5, a mode switch 6, a flashlight control button 7 and a power plug 8.

The casing 1 is exemplified as tubular in shape and as having a size suitable for portable use.

The circuit unit 2 and the lighting unit 3 are disposed in the casing 1 and are electrically connected. The lighting unit 3 is exemplified as including light emitting diode(s) for generating light. The casing 1 is provided with a lamp shade 11 for converging the light generated by the lighting unit 3.

The circuit unit 2 includes a control module 21 a seismic sensory module 22, a transmitter module 23, heating module 24, and a speaker 25.

The control module 21 is exemplified as microcontroller unit (not shown), such as a SN8F27E65 series microcontroller, and performs signal processing and control functions.

The seismic sensory module 22 is electrically connected to the control module 21 and is capable of detecting an earthquake. In this embodiment, the seismic sensory module 22 is exemplified as using a three-axis gravity sensor that is capable of detecting variations in accelerations of the earthquake alarming device 100 in three mutually perpendicular axes.

The transmitter module 23 is electrically connected to the control module 21 and is capable of transmitting a wireless signal for communication with a computer or a remote rescue equipment (not shown). The wireless signal may be a radio frequency (RF) signal, a radio frequency identification (RFID) signal or a wireless network signal that indicates relevant rescue information.

The heating module 24 is electrically connected to the control module 21 and is capable of generating heat so as to be picked up by thermal imaging equipment, such as an infrared life detector, for search and rescue purposes.

The speaker 25 is electrically connected to the control module 21 and is capable of generating an audio alarm.

The rechargeable battery 4 is disposed in the casing 1 and is electrically connected to the control module 21 as an alternative power source.

The indicator lamp unit 5 is electrically connected to the control module 21, and includes first, second, third and fourth indicator lamps 51, 52, 53, 54 and a charging indicator lamp 55.

The mode switch 6 is exposed from the casing 1, is connected to the control module 21, and is operable to move among four different positions so as to switch operation of the earthquake alarming device 100 among four different modes, namely a manual help-seeking mode, an earthquake alert mode, an all-off mode and a flashlight mode.

The flashlight control button 7 is exposed from the casing 1, is connected to the control module 21, and is operable to trigger the control module 21 to control the lighting unit 3 to emit the light.

The plug 8 is electrically connected to the rechargeable battery 4 and the control module 21, and is adapted to be connected to a mains supply (not shown) for obtaining electricity therefrom and providing the same to the electric components of the earthquake alarming device 100 and for charging the rechargeable battery 4. When the plug 8 is connected to the mains supply, the charging indicator lamp 55 can emit, e.g., green light if the rechargeable battery 4 is fully charged, or emit, e.g., red light if otherwise.

Referring to FIGS. 2, 3, 4A and 4B, operation of the earthquake alarming device 100 according to this embodiment is introduced as follows.

As mentioned above, the earthquake alarming device 100 has four modes of operation: the manual help-seeking mode, the earthquake alert mode, the all-off mode and the flashlight mode.

In step S1, the control module 21 determines which mode of operation the earthquake alarming device 100 is in based on the position of the mode switch 6. If it is determined in step S1 that the earthquake alarming device 100 is in the manual help-seeking mode, the flow goes to step S2, where the control module 21 controls the first indicator lamp 51 to light up to indicate that the earthquake alarming device 100 is currently operating in the manual help-seeking mode, controls the lighting unit 3 to emit the light to assist the user in observing the environment, controls the heating module 24 to generate the heat to help the user be located by search and rescue personnel, and controls the transmitter module 23 to transmit the wireless signal to notify the outside world that help is needed. After step S2, the process goes back to step S1.

If it is determined in step S1 that the earthquake alarming device 100 is in the earthquake alert mode, the flow goes to step S3', where the control module 21 controls the second indicator lamp 52 to light up to indicate that the earthquake alarming device 100 is currently operating in the earthquake alert mode, and then proceeds to step S3, where the control module 21 determines whether electricity is received from the mains supply via the plug 8. If affirmative, the process proceeds directly to step S7; otherwise, a power blackout might have occurred, and the process proceeds to step S4, where the rechargeable battery 4 is used to provide the power necessary for operation of the earthquake alarming device 100, and the control module 21 controls the lighting unit 3 to emit the light for emergency lighting. The process proceeds to step S5 after completion of step S4, so as to monitor if the power comes back on. It is noted herein that, preferably, the earthquake alarming device 100 operates in the earthquake alert mode when the plug 8 is plugged into a wall socket.

In other words, in step S5, the control module 21 determines whether electricity is received from the mains supply via the plug 8. If affirmative, the flow proceeds to step S6, where the control module 21 turns off the lighting unit 3; otherwise, the flow proceeds directly to step S7. The flow proceeds to step S7 after completion of step S6.

In step S7, the control module 21 determines whether a notification has been received from the seismic sensory module 22 to inform the control module 21 that an earthquake is detected. If affirmative, the process proceeds to step S8; otherwise, the flow goes back to step S1. In step S8, the control module 21 controls the lighting unit 3 to emit the light, e.g., in a blinkering manner, controls the heating module 24 to generate the heat, controls the speaker 25 to generate the audio alarm, and controls the transmitter module 23 to transmit the wireless signal.

Optionally, the lighting unit 3, the speaker 25, the heating module 24 and the transmitter module 23 may be respectively turned off by the control module 21 at flexibly set timings after the control module 21 is informed by the seismic sensory module 22 that the earthquake has stopped. For example, the speaker 25 may be turned off three seconds after the earthquake is detected to have stopped. The lighting unit 3 and the heating module 24 may be turned off three minutes after the earthquake is detected to have stopped. The transmitter module 23 may be turned off three days after the earthquake is detected to have stopped. The flow goes back to step S1 after completion of step S8.

If it is determined in step S1 that the earthquake alarming device 100 is in the all-off mode, the flow goes to step S9, where the control module 21 controls the third indicator lamp 53 to light up to indicate that the earthquake alarming device 100 is currently operating in the all-off mode, and turns off the lighting unit 3, the speaker 25, the heating module 24 and the transmitter module 23. The earthquake alarming device 100 may operate in the all-off mode during transportation, for instance. The flow goes back to step S1 after completion of step S9.

If it is determined in step S1 that the earthquake alarming device 100 is in the flashlight mode, the flow goes to step S10, where the control module 21 controls the fourth indicator lamp 54 to light up to indicate that the earthquake alarming device 100 is currently operating in the flashlight mode, and turns off the seismic sensory module 22, the heating module 24, the speaker 25 and the transmitter module 23. Then, in step S11, the control module 21 determines whether the flashlight control button 7 is pressed. If affirmative, the process goes to step S12, where the control module 21 controls the lighting unit 3 to emit the light; otherwise, the process goes back to step S1. In the flashlight mode, the earthquake alarming device 100 serves essentially as a portable flashlight.

Alternatively, the flashlight control button 7 may also serve as a control button to switch the operation of the earthquake alarming device 100 to the manual help-seeking mode when pressed regardless of the current mode of operation the earthquake alarming device 100. One skilled in the art would appreciate that actual implementation of this invention may vary according to different design requirements, and this invention is not to be limited in this regard.

Figure 5:
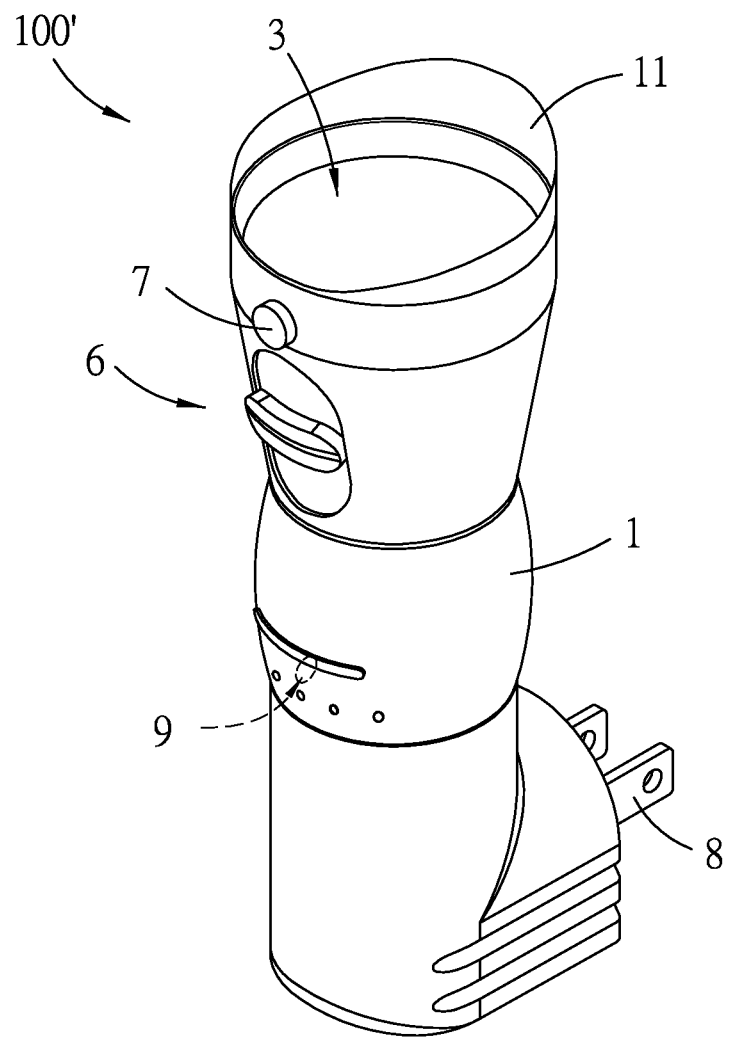
FIG. 5 is a perspective view of an earthquake alarming device according to the second preferred embodiment of this invention.
Figure 6:
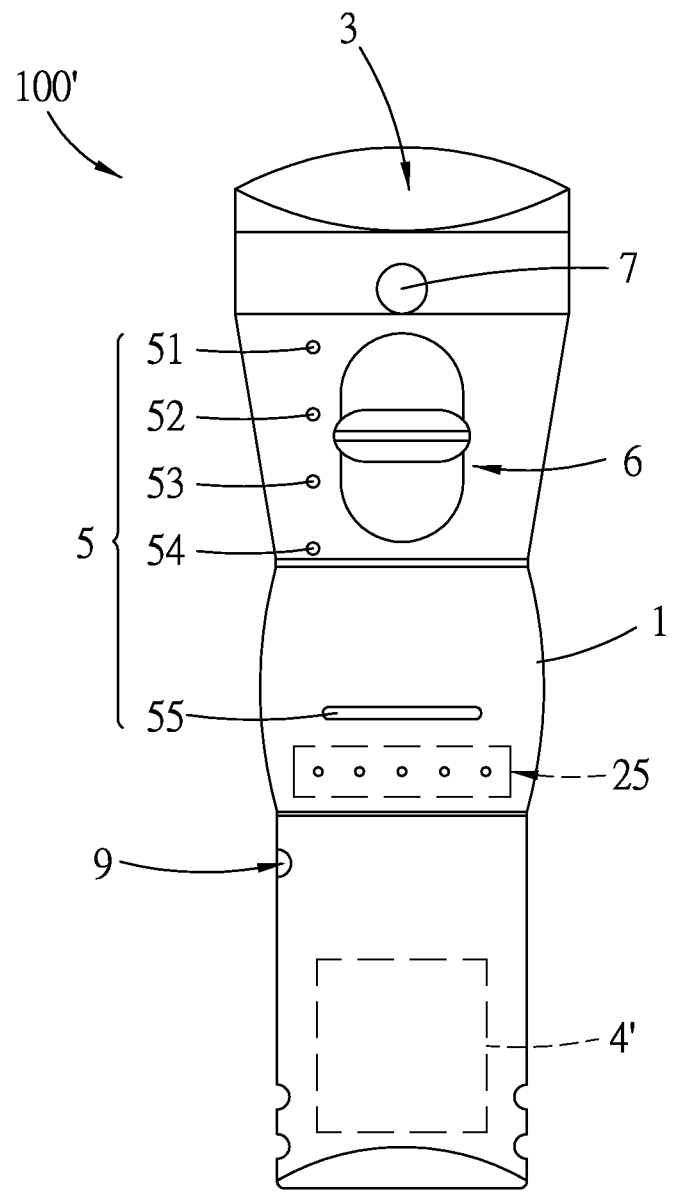
FIG. 6 is a front schematic view of the second preferred embodiment.

Referring to FIGS. 5 and 6, the earthquake alarming device 100' according to the second preferred embodiment of this invention is similar to that of the first preferred embodiment except that the earthquake alarming device 100' further includes a connector 9 that is exposed from the casing 1 and that is electrically connected to the control module 21. The connector 9 is adapted to be electrically connected to an external device (not shown), such as an electric door opener, a gas switch, etc. When operating in the earthquake alert mode, the control module 21 generates a control signal to be transmitted via the connector 9 to the external device upon being informed by the seismic sensory module 22 that an earthquake is detected so as to control operation of the external device. For example, in the case where the external device is an electric door opener, the control signal would be to turn on the electric door opener so as to automatically open a door, and in the case where the external device is a gas switch, the control signal would be to turn off the gas switch to prevent gas leakage. In other words, the earthquake alarming device 100' has an enhanced safety measure.

It should be noted herein that optionally, the earthquake alarming device 100, 100' may further include a gyroscope (not shown) to be connected to the seismic sensory module 22 to detect inertial variations of the earthquake alarming device 100, 100' so that the inertial variations may be taken into consideration during the detection of earthquakes. This might be helpful if, for instance, the earthquake alarming device 100, 100' is adapted to be plugged into a cigarette lighter receptacle of a vehicle for use.

To sum up, the earthquake alarming device 100, 100' is designed to be portable, and may be used as a flashlight under the flashlight mode. With the provision of the transmitter unit 23, the heating module 24, and the lighting unit 3, the earthquake alarming device 100, 100', when operating under the earthquake alert mode, is not only capable of providing an audio alarm as with the prior art, but is also capable of generating heat that facilitates thermal infrared rescue, provide emergency lighting, and provide notification to the outside world of rescue-related information in the form of a wireless signal, thereby providing an enhanced rescue assisting capability.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. An earthquake alarming device with rescue assisting capability, comprising:
    a casing; and
    a circuit unit disposed in said casing and including
        a control module,
        a seismic sensory module that is electrically connected to said control module and that is capable of detecting an earthquake,
        a speaker that is electrically connected to said control module and that is capable of generating an audio alarm,
        a transmitter module that is electrically connected to said control module and that is capable of transmitting a wireless signal; and
        a heating module that is electrically connected to said control module and that is capable of generating heat;
    wherein said control module controls said heating module to generate the heat, controls said speaker to generate the audio alarm and controls said transmitter module to transmit the wireless signal upon being informed by said seismic sensory module that an earthquake is detected.

2. The earthquake alarming device of claim 1, wherein the wireless signal is one of a radio frequency (RF) signal, a radio frequency identification (RFID) signal and a wireless network signal to indicate relevant rescue information.

3. The earthquake alarming device of claim 1, further comprising a lighting unit disposed in said casing and connected electrically to said control module of said circuit unit, said control module further controlling said lighting unit to emit light upon being informed by said seismic sensory module that an earthquake is detected.

4. The earthquake alarming device of claim 3, wherein said lighting unit emits the light in a blinkering manner.

5. The earthquake alarming device of claim 3, further comprising a mode switch exposed from said casing and operable to switch operation of said earthquake alarming device between an earthquake alert mode and a flashlight mode, and a flashlight control button exposed from said casing and operable to trigger said control module to control said lighting unit to emit the light;
    wherein when said earthquake alarming device operates under the earthquake alert mode, said control module controls said heating module to generate the heat, controls said speaker to generate the audio alarm and controls said transmitter module to transmit the wireless signal upon being informed by said seismic sensory module that an earthquake is detected; and
    wherein when said earthquake alarming device operates under the flashlight mode, said control module turns off said seismic sensory module, said heating module, said speaker and said transmitter module, and controls said lighting unit to emit the light upon being triggered by said flashlight control button.

6. The earthquake alarming device of claim 5, further comprising a rechargeable battery disposed in said casing and electrically connected to said control module.

7. The earthquake alarming device of claim 1, further comprising a connector exposed from said casing and electrically connected to said control module, said connector being adapted to be electrically connected to an external device, said control module generating a control signal to be transmitted via said connector to the external device upon being informed by said seismic sensory module that an earthquake is detected so as to control operation of the external device.

* * * * *